(12) United States Patent
Bloxham et al.

(10) Patent No.: US 9,617,868 B2
(45) Date of Patent: Apr. 11, 2017

(54) GAS TURBINE ENGINE VARIABLE GEOMETRY FLOW COMPONENT

(71) Applicant: Rolls-Royce North American Technologies, Inc., Indianapolis, IN (US)

(72) Inventors: Matthew J. Bloxham, Indianapolis, IN (US); Craig E. Heathco, Martinsville, IN (US); Adam D. Ford, Plainfield, IN (US); Robert T. Duge, Carmel, IN (US); Thomas I. Gorman, Plainfield, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 633 days.

(21) Appl. No.: 14/090,953

(22) Filed: Nov. 26, 2013

(65) Prior Publication Data

US 2014/0237987 A1 Aug. 28, 2014

Related U.S. Application Data

(60) Provisional application No. 61/769,619, filed on Feb. 26, 2013.

(51) Int. Cl.
*F01D 5/18* (2006.01)
*F01D 5/14* (2006.01)
*F01D 17/14* (2006.01)

(52) U.S. Cl.
CPC ............. *F01D 17/14* (2013.01); *F01D 5/146* (2013.01); *F01D 5/186* (2013.01); *Y02T 50/673* (2013.01)

(58) Field of Classification Search
CPC .......... F01D 17/14; F01D 5/146; F01D 5/186; Y02T 50/673
See application file for complete search history.

(56) References Cited

U.S. PATENT DOCUMENTS

| | | | |
|---|---|---|---|
| 2,314,572 A | | 3/1943 | Chitz |
| 2,351,516 A | * | 6/1944 | Jandasek ................ F16H 61/56 415/130 |

(Continued)

FOREIGN PATENT DOCUMENTS

| | | |
|---|---|---|
| EP | 1118747 A2 | 7/2001 |
| EP | 1122407 A2 | 8/2001 |

(Continued)

OTHER PUBLICATIONS

International Search Report for PCT International Application Serial No. PCT/US2013/071901, completed Jul. 22, 2014, (17 pages).

*Primary Examiner* — Carlos A Rivera
(74) *Attorney, Agent, or Firm* — Barnes & Thornburg LLP

(57) ABSTRACT

A variable geometry mechanism suitable for use in a gas turbine engine is disclosed in which movable vane segments which are coupled to a rotatable ring, or rings, are used to change an aerodynamic property of a working fluid flowing through the gas turbine engine. The movable vane segments can be rotated through the ring, or rings, between a first position associated with the first vane and a second position associated with a second vane to place the movable vane segments in proximity to one or the other of the first and second vanes of the gas turbine engine. The movable vane segments can be used to alter, among other things, camber, exit flow area, and can be used to influence and/or accommodate such properties as incidence angle, and swirl angle.

20 Claims, 5 Drawing Sheets

(56) References Cited

U.S. PATENT DOCUMENTS

| | | | |
|---|---|---|---|
| 2,755,628 A * | 7/1956 | Mamo | F16H 41/26 |
| | | | 415/166 |
| 3,162,421 A | 12/1964 | Gottfried | |
| 3,442,493 A | 5/1969 | Smith | |
| 3,723,021 A | 3/1973 | Bartholomew | |
| 3,756,739 A * | 9/1973 | Boussuges | F03B 3/103 |
| | | | 415/161 |
| 3,887,297 A | 6/1975 | Welchek | |
| 4,053,256 A | 10/1977 | Hertel | |
| 4,183,209 A | 1/1980 | Kronogard | |
| 4,512,718 A * | 4/1985 | Stargardter | F01D 5/142 |
| | | | 415/181 |
| 4,705,452 A | 11/1987 | Karadimas | |
| 4,995,786 A | 2/1991 | Wheeler et al. | |
| 5,314,301 A | 5/1994 | Knight | |
| 5,372,485 A * | 12/1994 | Sumser | F02C 6/12 |
| | | | 415/166 |
| 5,520,511 A | 5/1996 | Loudet et al. | |
| 6,099,245 A | 8/2000 | Bunker | |
| 6,179,559 B1 | 1/2001 | Weaver | |
| 6,715,983 B2 * | 4/2004 | Koshoffer | F01D 5/146 |
| | | | 415/1 |
| 6,993,903 B2 * | 2/2006 | Shin | F16H 41/26 |
| | | | 60/345 |
| 7,114,911 B2 | 10/2006 | Martin et al. | |
| 7,444,802 B2 | 11/2008 | Parry | |
| 7,632,064 B2 | 12/2009 | Somanath et al. | |
| 2001/0036401 A1 | 11/2001 | Harvey et al. | |
| 2005/0244265 A1 | 11/2005 | Dailey et al. | |
| 2009/0016871 A1 | 1/2009 | McCaffrey | |

FOREIGN PATENT DOCUMENTS

| | | |
|---|---|---|
| EP | 2014871 A2 | 1/2009 |
| GB | 1378346 A | 12/1974 |
| WO | 2008155243 A1 | 12/2008 |

* cited by examiner

GAS TURBINE ENGINE VARIABLE GEOMETRY FLOW COMPONENT

CROSS REFERENCE TO RELATED APPLICATIONS

This application claims priority to and the benefit of U.S. Provisional Patent Application No. 61/769,619, filed 26 Feb. 2013, the disclosure of which is now expressly incorporated herein by reference.

TECHNICAL FIELD

The present invention generally relates to gas turbine engine flow components, and more particularly, but not exclusively, to gas turbine engine flow components having variable geometry.

BACKGROUND

Providing variable geometry capabilities to gas turbine engine flow components remains an area of interest. Some existing systems have various shortcomings relative to certain applications. Accordingly, there remains a need for further contributions in this area of technology.

SUMMARY

One embodiment of the present invention is a unique gas turbine engine flow component. Other embodiments include apparatuses, systems, devices, hardware, methods, and combinations for varying the geometry of a gas turbine engine flow component. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
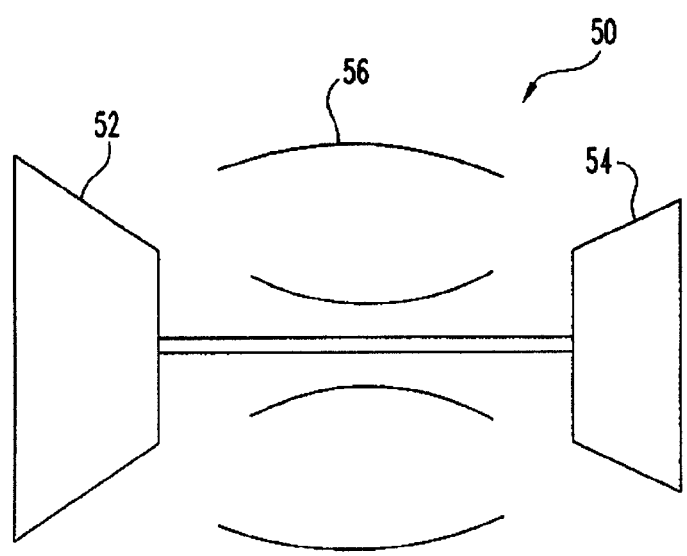
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of gas turbine engine 50 is shown and can be used to develop power for any number of applications such as, but not limited to, providing power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 includes turbomachinery components such as a compressor 52 and turbine 54 that are used to change a pressure of working fluid flowing therethrough in the production of useful power as will be appreciated. The turbomachinery components can include a variety of devices such as vanes and blades that can be used to influence the flow of the working fluid. In operation, the compressor 52 receives and compresses a working fluid whereupon it is delivered to a combustor 56 and mixed with a fuel. The combustor 56 is used to combust a mixture of working fluid and fuel and deliver a flow of products of combustion to the turbine 54. The flow of products of combustion are thereafter expanded in the turbine 54 and work is extracted to provide power, such as mechanical and electrical power.

The gas turbine engine 50 can take any variety of forms. For example, though the gas turbine engine 50 is shown as a turbojet in the illustrated embodiment, in other embodiments the gas turbine engine 50 can be a turboprop, turboshaft, or turbofan engine. In some forms the gas turbine engine 50 can be an adaptive and/or variable cycle engine. In short, any number of variations are contemplated herein for the gas turbine engine 50.

Figure 2:
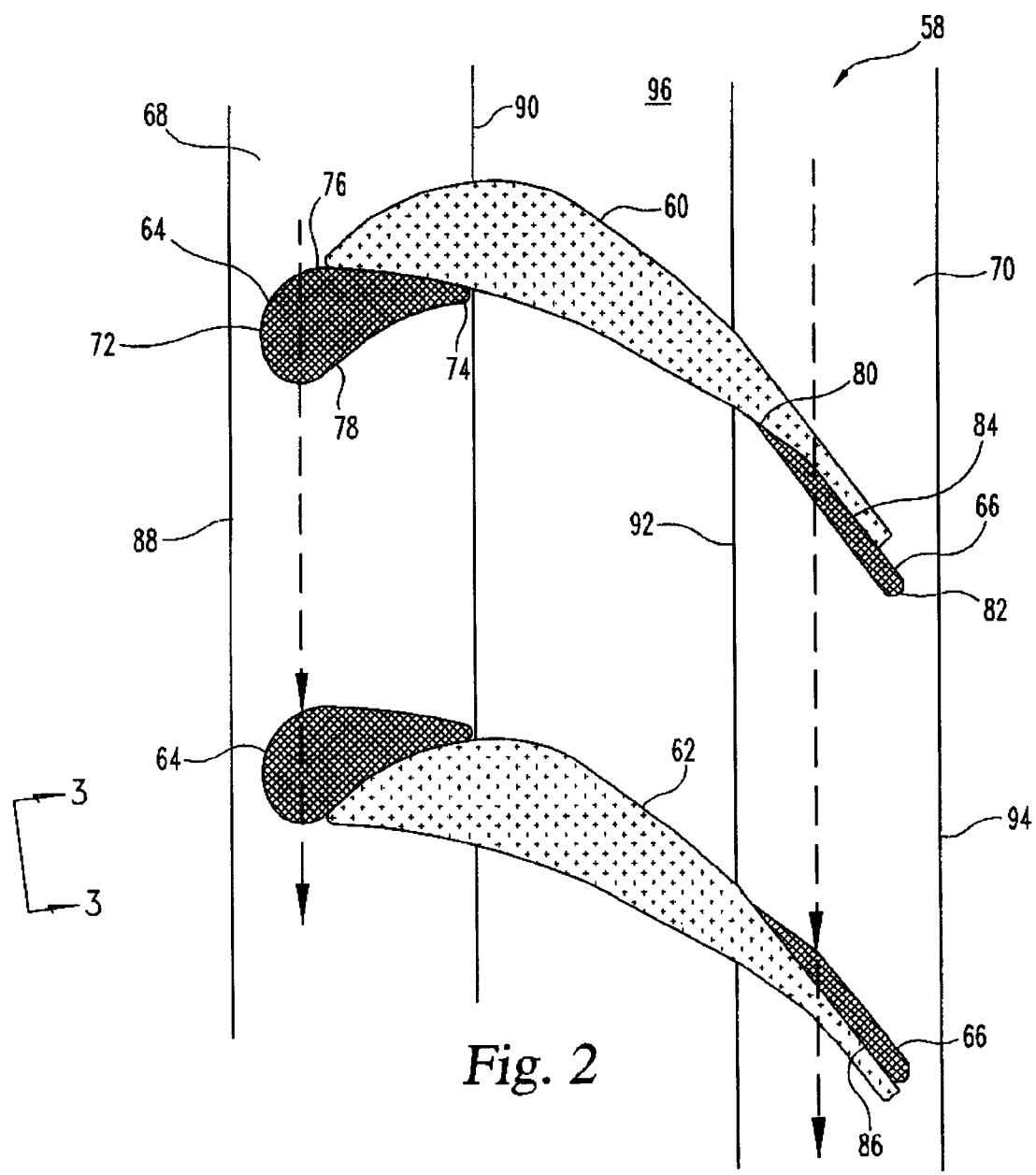
FIG. 2 depicts an embodiment of vane bodies and movable vane segments.

Turning now to FIG. 2, one embodiment is depicted of a component 58 in which is disposed vane bodies 60 and 62 which are located next to one another and are used to direct a working fluid flowing through the component 58. The vane bodies 60 and 62 can be used within the turbine section of the gas turbine engine 50, but other locations are also contemplated herein. For example, the vane bodies 60 and 62 can be located within the compressor section 52 of the gas turbine engine 50. Additionally and/or alternatively, the vane bodies 60 and 62 can be a fixed stationary stator vane for use in the gas turbine engine but other forms are also contemplated. As used herein, "fixed" can include configurations that do not rotate about an engine centerline, or that do not rotate relative to a fixed wheel/rotor/disk/etc. For example, the vane bodies 60 and 62 can be a rotatable bladed component and/or a variable stator vane in other embodiments. Thus, no limitation is intended unless otherwise explicitly stated to the contrary that the vane bodies 60 and 62 are limited to vanes or stationary stator vanes.

Also shown disclosed in FIG. 2 are movable vane segments 64 as well as movable vane segments 66 which can be used to adjust any number of aerodynamic properties of the airflow flowing through the component 58 through, for example, altering airfoil properties of the vane bodies 60 and 62 as will be appreciated given further discussion herein. The movable vane segments 64 and 66 are shown next to the top of vane body 60 in a first position and when moved to a second position are shown next to the bottom vane body 62. As used herein the terms "top" and "bottom" are for convenience of reference only and are not meant to imply any particular spatial arrangement within any given embodiment of the gas turbine engine 50. The movable vane segment 64 is shown coupled to ring 68 and the movable vane segment 66 is shown coupled to ring 70. The rings 68 and 70 can be circumferentially adjusted to alter the position of the movable vane segments 64 and 66 from the top position to the bottom position.

The movable vane segment 64 includes a bluff forebody 72 that extends forward of the vane body 60 and a narrow trailing edge 74 that resides next to a location aft of the leading edge of the vane body 62; however, it will be appreciated that not all embodiments of movable vane segment 64 need include the same configuration as depicted in FIG. 2. The movable vane segment 64 includes a top surface 76 and a bottom surface 78 which are placed in effective contact with the vane body 60 and thereafter change an aerodynamic characteristic of the working fluid flowing through the component 58. As used herein, the phrase "in effective contact" includes physical interfacing with no offset, as well as interfacing of sufficient physical proximity such that although a gap may be created the gap is of sufficient size to achieve the effect described herein of adjusting any number of aerodynamic properties of the airflow flowing through the component 58 through, for example, altering airfoil properties of the vane bodies 60 and 62. In one non-limiting form, the movable vane segment 64 is used to alter the camber angle and accommodate incidence angle changes of an incoming air flow stream. For example, in the top position shown in FIG. 2 the configuration of the movable vane segment 64 and vane body 60 is used to accept a large incidence angle relative to the configuration of the movable vane segment 64 and vane body 62.

The movable vane segment 66 includes a forward end 80 as well as an aft end 82 that extends past the main body 60 in the top position and is in close proximity to a trailing edge of the vane body 62 in the bottom position. Similar to the variations described above with regard to movable vane segment 64, the movable vane segment 66 can have any of various configurations and other embodiments relative to the illustrated embodiment shown in FIG. 2. The movable vane segment 66 includes a top surface 84 and a bottom surface 86 which are placed in effective contact with the vane bodies 60 and 62. Similar to the effects described above with regard to movable vane segments 64, effective contact of movable vane segment 66 with respect to vane bodies 60 and 62 provide for a change in an aerodynamic characteristic of the working fluid flowing through the component 58. In one non-limiting form, the movable 66 is used to alter throat area and exit swirl. For example, in a top position shown in FIG. 2 the configuration of the movable vane segment 66 and vane body 60 represents a relatively closed throat area in relation to the configuration of the vane segment 66 and vane body 62. The movable vane segment 66 includes a trailing edge that extends the chord of vane body 60 relative to the chord of vane body 62 as can be seen in FIG. 2.

Although the embodiment illustrated in FIG. 2 includes movable vane segments 64 and 66, it will be appreciated that some forms of the instant application may include only one of the movable vane segments 64 and 66. For example in some forms of the instant application the vane bodies 60 and 62 may include just the movable vane segment 64, while in other forms of the instant application of vane bodies 60 and 62 may only include the movable vane segments 66. Some examples of these embodiments are shown further below. Furthermore, any embodiment of the movable vane segments 64 described herein can be used alone or in combination with any embodiment of the movable vane segments 66. Similarly, any embodiment of the movable vane segments 66 described herein can be used alone or in combination with any embodiment of the movable vane segments 64.

The rings 68 and 70 can be actuated using any variety of techniques and furthermore can have any variety of configurations relative to the depiction shown in FIG. 2. In one non-limiting form the rings 68 and/or 70 can be actuated using hydraulic, pneumatic, and/or electromechanical actuation devices. The rings 68 and 70, furthermore, can be actuated at a variety of rates. In one form the actuation rate of ring 68 can be different than the actuation rate of ring 70. The rings 68 and 70 can be structured to rotate at the same time through any appropriate coupling mechanism, such that a single actuator can be used to drive both. It is also possible to operate the rings 68 and 70 at different times. In still other alternative and/or additional embodiments, the rings 68 and 70 can be actuated to rotate in opposite directions through appropriate coupling mechanisms and/or separate actuation devices. In short, the rings 68 and 70 can be actuated in the same direction, in opposite directions, sympathetically, simultaneously, etc. as will be appropriate for any given application.

The ring 68 includes an axially forward end 88 that extends axially forward of bluff forebody 72 and an axially aft end 90 that extends axially aft of the aft end of movable vane segment 64. In other embodiments the ring 68 can extend to locations other than those depicted in FIG. 2. For example the axially forward end 88 may be located aft of bluff forebody 72 while the axially aft end 90 remains aft of the trailing edge portion of movable vane segment 64. In other embodiments, the axially forward end 88 may remain as depicted in FIG. 2 while the axially aft end 90 is located forward of the trailing edge portion of the movable vane segment 64. In still further embodiments the bluff forebody 72 may extend forward of the axially forward end 88 while the trailing edge portion of movable vane segment 64 may extend aft of the axially aft end 90 of the ring 68. In short, the ring 68 can have any of various configurations relative to the movable vane segment 64.

The ring 70 includes an axially forward end 92 that extends axially forward of forward end 80 and an axially aft end 94 that extends axially aft of the aft end 82. In other embodiments the ring 70 can extend to locations other than those depicted in FIG. 2. For example the axially forward end 92 may be located aft of forward end 80 while the axially aft end 94 remains aft of the aft end 82. In other embodiments, the axially forward end 92 may remain as depicted in FIG. 2 while the axially aft end 94 is located forward of the aft end 82. In still further embodiments the forward end 80 may extend forward of the axially forward end 92 while the aft end 82 may extend aft of the axially aft end 94 of the ring 70. In short, the ring 70 can have any of various configurations relative to the movable vane segment 64.

The rings 68 and 70 are movable relative to a base 96 to which, in some embodiments, the vane bodies 60 and 62 can be coupled. The base 96 can be a casing of the gas turbine engine 50, among other possible structures. In some forms one or more seals can be disposed at the interface between ring 68 and base 96 and or at the interface between ring 70 and base 96. Such seals can take the form of circumferential ring seals, among other possibilities.

Figure 3:
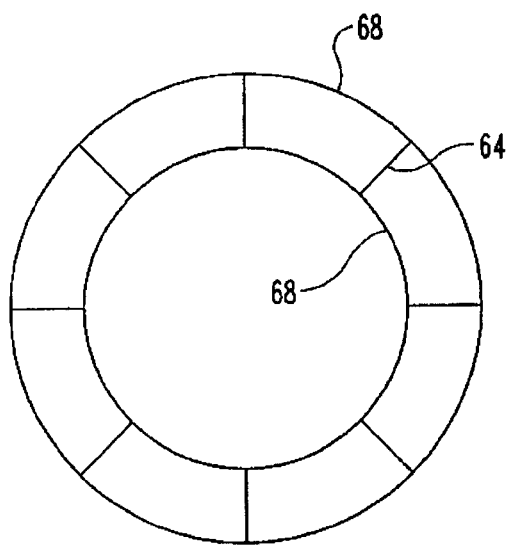
FIG. 3 depicts an embodiment of rings and movable vane segments.
Figure 4:
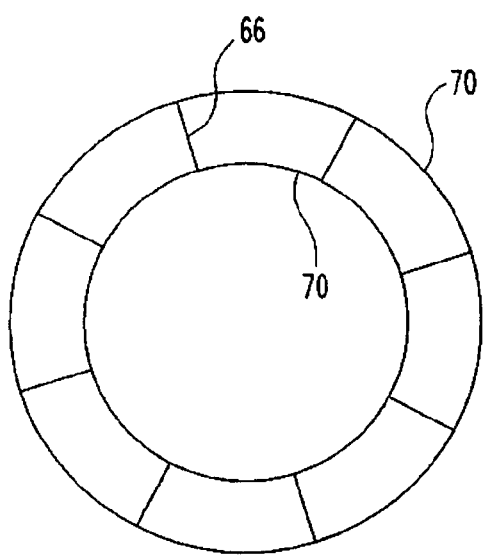
FIG. 4 depicts an embodiment of rings and movable vane segments.

Turning now to FIGS. 3 and 4, a side view of component 58 in which can be seen a variety of characteristics of the illustrated embodiment depicted in FIG. 2. The movable vane segment 64 extends between an inner ring 68 and an outer ring 68. The movable vane segment 64 can be affixed to both the inner ring 68 and the outer ring 68 such that the movable vane segment 64 does not move relative to either the inner ring 68 or outer ring 68. In some forms the movable vane segment 64 can be integrally formed with the inner ring 68 and outer ring 68, but in other forms the movable vane segment 64 can be coupled to one or both of the inner ring 68 and outer ring 68 through mechanical, metallurgic, etc. techniques. In still additional and/or alternative embodiments, one of the inner ring 68 and outer ring 68 may be eliminated, such that the movable vane segment 64 is supported as a cantilever from the remaining inner ring 68 or outer ring 68.

The inner ring 68 can represent an inner flow path surface through the component 58 and the outer ring 68 can represent an outer flow path surface through the component 58. Accordingly, as can be seen in FIG. 3, the movable vane segment 64 extends from the inner flow path surface to the outer flow path surface and can correspondingly extend substantially along the entirety of the span of the vane bodies 60 and 62 (not shown) as it extends substantially between the inner flow path surface and the outer flow path surface.

The movable vane segment 64 can have any variety of shapes along its span as it extends between the inner ring 68 and outer ring 68. For example, the shape of the bluff forebody 72 can change as a function of the span, the chord length of the movable vane segment 64 can likewise change as a function of span, among other possible variations. Thus, the movable vane segment 64 can extend along the entirety of the span of the vane bodies 60 and 62, but given variations in the shape of the movable vane segment 64, the effect of the movable vane segment 64 may vary substantially between the inner flow path location of the vane bodies 60 and 62 in the outer flow path location of the vane bodies 60 and 62. For example, in some span locations the movable vane segment 64 can have substantially minimal impact.

The movable vane segment 66 extends between an inner ring 70 and an outer ring 70. The movable vane segment 66 can be affixed to both the inner ring 70 and the outer ring 70 such that the movable vane segment 66 does not move relative to either the inner ring 70 or outer ring 70. In some forms the movable vane segment 66 can be integrally formed with the inner ring 70 and outer ring 70, but in other forms the movable vane segment 66 can be coupled to one or both of the inner ring 70 and outer ring 70 through mechanical, metallurgic, etc. techniques. In still additional and/or alternative embodiments, one of the inner ring 70 and outer ring 70 may be eliminated, such that the movable vane segment 66 is supported as a cantilever from the remaining inner ring 70 or outer ring 70.

The inner ring 70 can represent an inner flow path surface through the component 58 and the outer ring 70 can represent an outer flow path surface through the component 58. Accordingly, as can be seen in FIG. 4, the movable vane segment 66 extends from the inner flow path surface to the outer flow path surface and can correspondingly extend substantially along the entirety of the span of the vane bodies 60 and 62 (not shown) as it extends substantially between the inner flow path surface and the outer flow path surface.

The movable vane segment 66 can have any variety of shapes along its span as extends between the inner ring 70 and outer ring 70. For example, the thickness of the movable vane segment 66 can change as a function of the span, the chord length of the movable vane segment 66 can likewise change as a function of span, among other possible variations. Thus, the movable vane segment 66 can extend along the entirety of the span of the vane bodies 60 and 62, but given variations in the shape of the moveable vane segment 66, the effect of the movable vane segment 66 may vary substantially between the inner flow path location of the vane bodies 60 and 62 and the outer flow path location of the vane bodies 60 and 62. For example, in some span locations the movable vane segment 66 can have substantially minimal impact.

As shown in FIGS. 3 and 4, the rings 68 and 70 are shown as substantially continuous structures having a distinct annular shape. It will be appreciated however that the term "ring" includes any number of variations that are not strictly annular shape but that rather have a general annular shape as viewed from one or more perspectives of the ring. For example a "ring" shape may refer primarily to the inner flow path surface as it would correspond to an outer portion of a common ring such as those worn on a finger, while the interior portions of the ring 68 may not provide for a substantially open area through which a protrusion such as a finger can extend. Such a ring shape will be appreciated as describing outer surface portion that will allow for structural variations to permit effective construction and operation of the ring 68 as it is used to actuate the movable vane segment 64. The same variations for ring 70 are also contemplated herein.

Among the many variations of either ring 68 or ring 70, a segmented structure can be provided that when integrated provides for the function as described herein. For example, the radially extending movable vane segments 64 and 66 can radiate from an interior location closer to the center of the shape as depicted in FIG. 3, while a number of path surface segments are constructed and affixed to the extent between the movable vane segment 64 to form the inner flow best surface above. Additionally and/or alternatively, the same variations also apply to ring 70.

Furthermore, although separate rings 68 and 70 are depicted in the illustrated embodiment, it will be appreciated that in some applications the structure that is used to actuate the movable vane segments 64 and 66 can be a single ring structure. For example, one non-limiting form includes the movable vane segment 64 and movable vane segment 66 supported from a single ring whether that single ring is the ring 68 or ring 70. In this non-limiting embodiment, it will be appreciated that the ring used to support both the movable vane segment 64 and movable vane segment 66 may have a configuration other than that that disclosed in FIG. 2.

Figure 5:
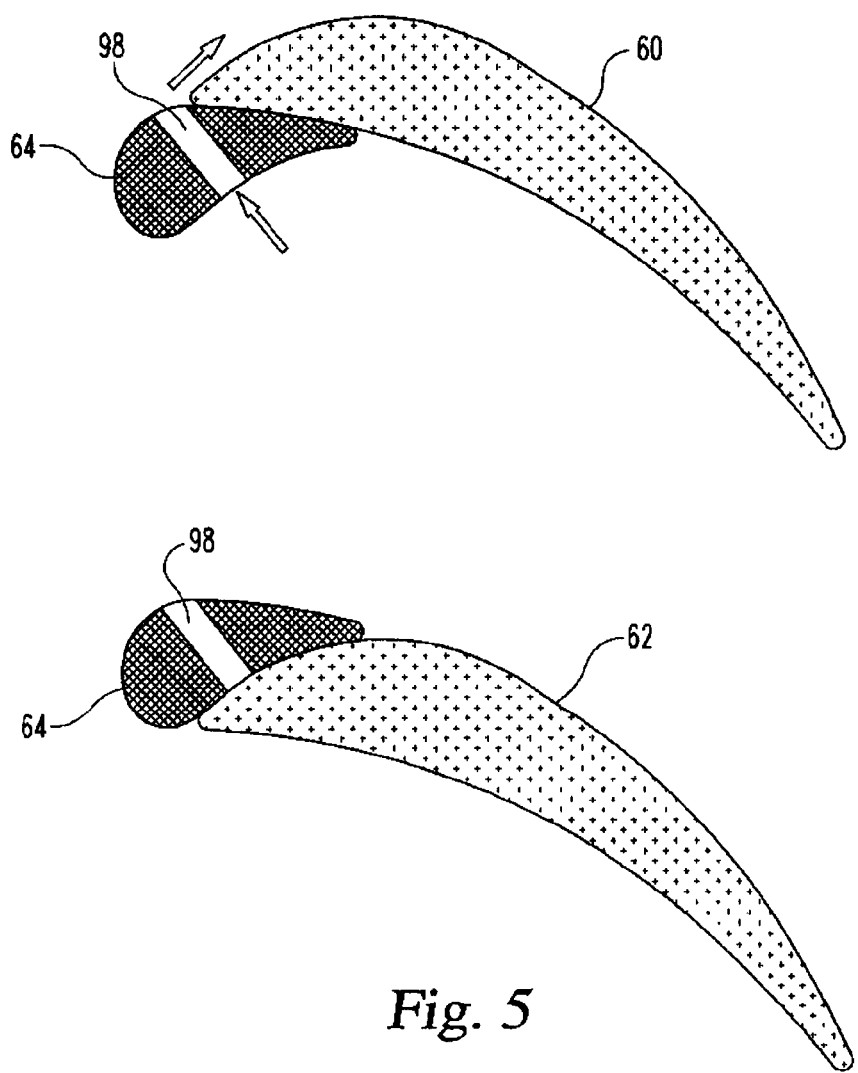
FIG. 5 depicts an embodiment of vanes and a movable vane segment having an opening through which working fluid to pass.
Figure 6:
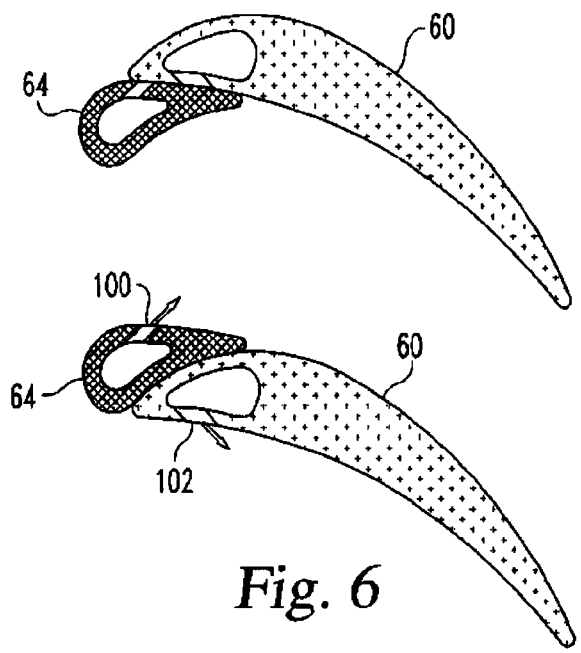
FIG. 6 depicts an embodiment of vanes and a movable vane segment having openings through which working fluid to pass.

Turning now to FIGS. 5, 6 and, 7, non-limiting variations are shown of movable vane segments and/or vane bodies having openings through which working fluid is permitted to pass. For example, turning now to FIG. 5, movable vane segment 64 includes a flow control passage 98 that can be selectively open and selectively closed based upon the position of the movable vane segment 64. When in the bottom position shown in FIG. 5, the flow control passage 98 is blocked by the vane body 62 such that working fluid does not flow through the passage 98. When in a top position, however, the flow control passage 98 is exposed such that working fluid can pass from a relatively high pressure side of the movable vane segment 64 to a relatively low pressure side of the movable vane segment 64.

FIG. 6 depicts yet another non-limiting embodiment in which a cooling passage 100 is formed in movable vane segment 64 and a cooling passage 102 is formed in the vane bodies 60 and 62. Both of the cooling passages 100 and 102 can be selectively opened and selectively closed based upon a position of the movable vane segment 64. When in the top position shown in FIG. 6 the cooling passages 100 and 102 are substantially closed such that little to no cooling fluid is permitted to exit the cooling passages 100 and 102. When in the bottom position, however, the cooling passages 100 and 102 are not blocked such that a cooling fluid can pass through the cooling passages 100 and 102. The discharge of cooling fluid through the cooling passages 100 and 102 can be used to provide film cooling.

Figure 7:
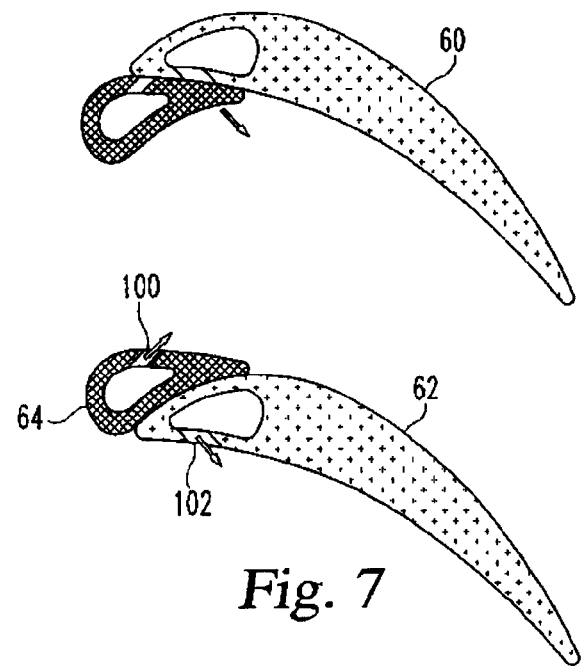
FIG. 7 depicts an embodiment of vanes and a movable vane segment having openings through which working fluid to pass.

FIG. 7 discloses yet another non-limiting variation in which cooling passages 100 and 102 are used similarly to the embodiments described above with regard to FIG. 6, with the exception that in the top position the cooling passage 100 is blocked but the interface between movable vane segment 64 and the vane body 60 provides a subsequent passage through which fluid ejected from cooling passage 102 can pass to aid in either cooling and/or flow control. The discharge of cooling fluid through the cooling passages 100 and 102 can be used to provide film cooling.

The passages 98, 100, and 102 are just a few of any variations of similar passages. For example, any passage provided in the movable vane segment 64, movable vane segment 66, vane body 60, or vane body 62, whether or not similar to passages 98, 100, and 102, can have any of various cross-sectional geometries, lengths, shapes of passages, etc. Furthermore, any passages provided can be distributed along the span of any of the devices to which the passages are associated. The passages can be holes, slots, etc. as will be appreciated.

Working fluid suitable for discharge through any of cooling passages 100 and 102 can originate from any suitable location. For example, the working fluid can be a cooled cooling air that is created from compressor discharge air that has been cooled through a suitable heat exchanger.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine component having a plurality of fixed airfoil members distributed circumferentially about a reference axis;
at least one movable airfoil extension structured for use in a flow path of a gas turbine engine and positioned intermediate a first one of the plurality of fixed airfoil members and a second one of the plurality of fixed airfoil members, the at least one movable airfoil extension configured to be moved between a first operating position adjacent the first one of the plurality of fixed airfoil members and a second operating position adjacent the second fixed airfoil member, wherein at transition positions intermediate the first operating position and the second operating position the at least one movable airfoil extension is free of interfacing contact with the first and second one of the plurality of airfoil members; and
wherein movement of the at least one movable airfoil extension between the first operating position and the second operating position alters a flow path characteristic of both the first one of the plurality of fixed airfoil members and the second one of the plurality of fixed airfoil members;
wherein the flow path characteristic is at least one of inlet incidence, exit swirl, effective throat area, and camber;
wherein the at least one movable airfoil extension is a leading edge addition, which further includes another airfoil extension located at a trailing edge, and wherein the plurality of fixed airfoil members includes cooling apertures that are exposed in the first operating position and covered in the second operating position.

2. The apparatus of claim 1, wherein the fixed airfoil members are gas turbine engine vanes and the gas turbine engine component is a turbine, and which further includes the gas turbine engine having a compressor and a combustor.

3. The apparatus of claim 1, which further includes a plurality of airfoil extensions which includes the at least one airfoil extension and the plurality of airfoil extensions are positioned intermediate neighboring fixed airfoil members, wherein the plurality of airfoil extensions include cooling holes through which a cooling fluid exits during operation in the first operating position of the movable airfoil extensions, and wherein the cooling holes are exposed in the first operating position and closed in the second operating position.

4. The apparatus of claim 3, wherein the plurality of airfoil extensions are connected to rotate with a ring structure, and wherein the plurality of airfoil extensions includes flow control passages that permit working fluid to flow from respective pressure sides to respective suction sides in the first operating position, and wherein the flow control passages are covered in the second operating position to discourage a flow of working fluid.

5. The apparatus of claim 1, wherein the leading edge addition is coupled to a first ring structure for movement therewith and the another airfoil extension located at the trailing edge is coupled to a second ring structure for movement therewith.

6. The apparatus of claim 5, wherein the first ring structure is configured to be adjusted circumferentially to selectively alter the position of the leading edge addition between the first operating position and the second operating position and the second ring structure is configured to be adjusted circumferentially to selectively alter the position of the another airfoil extension between the first operating position and the second operating position.

7. An apparatus comprising:
a gas turbine engine flow path component having a plurality of airflow members disposed circumferentially about the flow path component;
a ring disposed with the flow path component having a plurality of radially projecting arms extending therefrom, the radially projecting arms including partial airflow member components structured to interact with the plurality of airflow members along a span of each of the plurality of airflow members, the partial airflow member components of the plurality of radially projecting arms interlaced with the plurality of airflow members such that a repeating pattern of projecting arm and airflow member is created around the ring;

wherein in a first mode of operation the ring is positioned in a first circumferential orientation to place the partial airflow member components in effective contact with a first one of the plurality of airflow members to create a first collective orientation; and wherein in a second mode of operation the ring is positioned in a second circumferential orientation offset from the first circumferential orientation to place the partial airflow member components in effective contact with a second one of the plurality of airflow members to create a second collective orientation;

wherein the partial airflow member components extend the entirety of the span of each of the plurality of airflow members that are exposed to working fluid during operation of a gas turbine engine;

wherein the partial airflow member components include a flow control passage that permits passage of working fluid from a high pressure region to a low pressure region of the partial airflow member components when in the first circumferential orientation, and wherein the second circumferential orientation discourages passage of working fluid through the flow control passage.

8. The apparatus of claim 7, wherein the plurality of airflow members are vanes.

9. The apparatus of claim 8, which further includes a gas turbine engine having a plurality of turbomachinery components and a combustor.

10. The apparatus of claim 9, wherein the plurality of radially projecting arms effect at least one of a camber, an incidence angle, a swirl angle, and a throat area.

11. The apparatus of claim 7, wherein each of the plurality of airflow members includes a cooling hole that exits into a space formed between the plurality of airflow members and the partial airflow member components in the first circumferential orientation, and wherein the second circumferential orientation permits a cooling film to exit through the cooling hole and through a cooling hole formed in the partial airflow member components.

12. The apparatus of claim 7, wherein each of the partial airflow member components includes a leading edge vane segment and a trailing edge vane segment that is spaced apart from the leading edge vane segment.

13. The apparatus of claim 12, wherein the flow control passage is formed in the leading edge vane segment.

14. The apparatus of claim 12, wherein each trailing edge vane segment extends past the corresponding airflow member when the ring is positioned in the first circumferential orientation.

15. A method comprising:
operating a gas turbine engine by compressing a working fluid and combusting a mixture of fuel and compressed working fluid;

flowing working fluid through a component that includes a circumferentially offset pair of first and second neighboring airfoil members;

rotating a ring in a circumferential direction that includes a secondary airfoil component structured to cooperate in a first orientation with the first neighboring airfoil member and to cooperate in a second orientation with the second neighboring airfoil member;

as a result of the rotating the ring in the circumferential direction:
swapping neighboring airfoils to which the secondary airfoil component is placed in proximity;

changing one of incidence angle, exit swirl angle, exit throat area, and camber of both the first and second neighboring airfoil members; and flowing a working fluid through a cooling passage of one of the first and second neighboring airfoil members based upon a circumferential position of the secondary airfoil component.

16. The method of claim 15, which further includes rotating a second ring in a circumferential direction wherein the second ring includes a plurality of second ring secondary airfoil components.

17. The method of claim 15, wherein the rotating further includes moving second secondary airfoil components stationed downstream of the secondary airfoil components.

18. The method of claim 15, which further includes selectively flowing a working fluid through an aperture of the secondary airfoil components based upon the position of the secondary airfoil components.

19. The method of claim 16, which further includes flowing a working fluid through an aperture of the secondary airfoil components based upon the orientation of the secondary airfoil components.

20. The method of claim 16, wherein each of the second ring secondary airfoil components extend axially past the first neighboring airflow member in response to the second ring being rotated.

* * * * *